United States Patent
Liu et al.

(10) Patent No.: US 10,033,526 B2
(45) Date of Patent: Jul. 24, 2018

(54) ONE INS NETWORK-BASED ANTI-FAULT ATTACK METHOD OF RANDOM INFECTION

(71) Applicant: Leibo Liu, Beijing (CN)

(72) Inventors: Leibo Liu, Beijing (CN); Bo Wang, Beijing (CN); Min Zhu, Beijing (CN); Ao Li, Beijing (CN); Shouyi Yin, Beijing (CN); Shaojun Wei, Beijing (CN)

(73) Assignee: Leibo Liu (CN)

( * ) Notice: Subject to any disclaimer, the term of this patent is extended or adjusted under 35 U.S.C. 154(b) by 144 days.

(21) Appl. No.: 15/218,893

(22) Filed: Jul. 25, 2016

(65) Prior Publication Data

US 2017/0359165 A1    Dec. 14, 2017

(30) Foreign Application Priority Data

Jun. 14, 2016   (CN) .................. 2016 1 04160282

(51) Int. Cl.
| | |
|---|---|
| *H04L 9/00* | (2006.01) |
| *G06F 21/55* | (2013.01) |
| *G06F 21/72* | (2013.01) |
| *H04L 9/06* | (2006.01) |
| *H04L 9/30* | (2006.01) |

(52) U.S. Cl.
CPC ............ *H04L 9/004* (2013.01); *G06F 21/556* (2013.01); *G06F 21/72* (2013.01); *H04L 9/0618* (2013.01); *H04L 9/304* (2013.01)

(58) Field of Classification Search
CPC ....... H04L 9/004; H04L 9/304; H04L 9/0618; G06F 21/556; G06F 21/72
See application file for complete search history.

(56) References Cited

U.S. PATENT DOCUMENTS

2007/0033417 A1* 2/2007 Gammel .................. G06F 21/72
713/189

OTHER PUBLICATIONS

Lomne, Victor et al., "On the Need of Randomness in Fault Attack Countermeasures—Application to AES", 2012 Workshop on Fault Diagnosis and Tolerance in Cryptography, pp. 85-94. (Year: 2012).*
Battistello, Alberto et al., "Fault Analysis of Infective AES Computations", 2013 Workshop on Fault Diagnosis and Tolerance in Cryptography, pp. 101-107. (Year: 2013).*
Patranabis, Sikhar et al., "Fault Tolerant Infective Countermeasure for AES", Security, Privacy, and Applied Cryptography Engineering. Lecture Notes in Computer Science, Nov. 13, 2015, 25 pages. (Year: 2015).*

* cited by examiner

*Primary Examiner* — Michael Pyzocha

(57) ABSTRACT

The present invention discloses an INS network-based anti-fault attack method of random infection, comprising the steps of sending the plain-text into an encryption processor, wherein two groups of cipher text are outputted through temporal or spatial redundancy; conducting XOR operation) on the two groups of said cipher text output to obtain the output difference; sending the said output difference into an infection function module to initiate an infection operation to obtain the infection result; conducting XOR operation on any of said groups of cipher text output to generate the final output. The present invention can realize the randomization of infection function in infection countermeasures, reduce the successful probability of fault attack and improve the safety of the circuit.

9 Claims, 6 Drawing Sheets

ONE INS NETWORK-BASED ANTI-FAULT ATTACK METHOD OF RANDOM INFECTION

FIELD OF INVENTION

The present invention relates to data security in the field of integrated circuits, particularly, to an INS network-based method of randomized anti-fault attack measures.

BACKGROUND

In recent years, physical attacks on software and hardware have been targeting the encryption algorithms rather than the vulnerabilities of the mathematical framework of the algorithm itself. Such attack has become a significant threat to hardware security. As a means for physical attack, faults are injected into circuits with precision to obtain the security key in encryption implementation. Presently, the precision of fault injection has been significantly improved. For example, the spot size of laser injection has reached the stage of the logic gate, and the time accuracy of the injection has reached the sub-nanosecond scale. This stage of threat makes attack-resistant capability of cryptographic algorithm an important indicator for measuring the hardware security of the hardware designer. Furthermore, anti-fault attack methods can be divided into two main types: fault detection and infection methods. In a conventional detection method, the redundant calculation results and the original calculation results are compared by repetitive computation or circuit copying to realize fault detection. If there are differences in the process of comparison, then the fault result will not be generated as output. However, it should be noted that the comparison operation itself may become a weak link. This is because the comparison operation always produces a one-bit judgment condition. Therefore, the comparison operation is easy to bypass by attacking, or by tampering with the value of the judgment conditions. In infection measures, the fault propagation pattern generated in fault injection will be destroyed by infection way. Accordingly, the attacker cannot restore the information contained in the cipher text even if he/she gets the infected fault cipher, so the attack process is invalid.

A large number of scholars have studied infection countermeasures study by focusing on block ciphers. In earlier studies, the deterministic calculations, including some simple linear operations such as exchange or XOR, etc., are used to perform infection functions. This operation is very easy to be implement, and produces a relatively small overhead. However, due to the certainty of infection functions, if the infection function is known to the attacker, the fault diffusion model can still be achieved by modifying the method of attack. Accordingly, the security of these countermeasures depend on the secrecy of the method itself. To solve this problem, randomness is introduced to the infection measures so that there are some uncertainties in the infection method. For example, one can randomly perform redundancy round function calculations or multiplication masking operations. Various countermeasures with targets to resist such attacks have been invented. This indicates that there are still vulnerabilities of these methods that enhance the randomness. In a high-performance cryptographic processor, Benes networks are widely used as an acceleration module to accelerate the replacement operation in the cryptographic algorithm. The Replacement operation is one of the common basic operations of the block cipher, which improves the security of cryptographic algorithms by disorganizing the bit position of input data. For specific encryption algorithm that uses ASIC hardware, the required displacement is fixed and can be implemented via a crossover cable. However, the cryptographic processor dynamically implements a variety of cryptographic algorithms as security protocols. Accordingly, the cryptographic processor should be able to achieve any desired replacement as a cipher algorithm. There are two solutions for the replacement operation in the cryptographic processor. First, because of the area limitation of the encryption processor, the processor either uses the original instructions (such as mask generation, AND, SHIFT and OR), or the more powerful bit manipulation instructions (such as EXTRACT and DEPOSIT) to implement the replacement operation in bits. Here, the clock period of realizing N-bit operations presents a linear relationship with N. Second, in a high-performance encryption processor, it typically adds additional multistage interconnection networks to realize the replacement operation. In the network, the data replacement can be realized by configuring the functions of each switch, and the processor calls this network module to achieve the function of the displacement. A Benes network (connecting two back to back butterfly networks) is a common multi-stage network that can achieve N various (N is the width of the BENES) of displacement without blocking. This non-blocking feature makes the Benes network structure, as replacement accelerated modules are widely used in high-performance cryptographic processors. However, to date, the Benes network module is only considered as an acceleration module, and no study has been presented that uses the network characteristics (such as random) of Benes network to resist fault attack.

SUMMARY OF THE INVENTION

The present invention provides a solution to the above-mentioned problems relating to cybersecurity environment and information security. Specifically, an INS network-based anti-fault attack method of random infection is presented to overcome the shortcomings of the existing technology.

To achieve the above technical purposes, the technical proposal of the present invention is implemented as follows:

A method for of implementing an INS network-based anti-fault attack of random infection, comprising: Sending the plain-text into an encryption processor, whereby two groups of cipher text are outputted through temporal or spatial redundancy, conducting XOR operation on the two groups of said cipher text output to obtain the output difference; Sending the said output difference into an infection function module to initiate an infection operation, so that the infection result can be obtained; Obtaining said infection results, then conducting XOR operation on any of the said groups of cipher text output to generate the final output.

Further, the above method generates normal execution results and redundant calculation results via a time redundancy mode through redundant computation. Additionally, the method generates normal execution results and redundant calculation results via a spatial redundancy mode in the two same circuits through copying the circuits, respectively.

In another embodiment of the present invention, the output difference is generated by the corresponding cipher text XOR or other corresponding intermediate variables XOR that are calculated by normal execution and redundancy.

In another embodiment of the INS network-based anti-fault attack method of random infection, Sending the said output difference into an infection function module, whereby the output difference is sent into the INS network to perform hamming weight balanced process, and continuously sending the resulting output to the INS network after the hamming weight balanced process is performed; and Initiating an output confusion operation to generate the infection results.

In another embodiment of the INS network-based anti-fault attack method of random infection, the XOR value of infection results is selected corresponding to the intermediate variable; and the infection results are generated as XOR with the selected intermediate variables if the selected intermediate variable is not cipher text; and the XOR results are used to replace the original intermediate variables; and the cryptographic algorithm is continuously performed to generate the final output.

In another embodiment of the present invention, the said output difference is sent into the INS network to perform a hamming weight balanced process, wherein said output difference is input into the low N/2 bit of INS, and wherein if the output difference is less than N/2 bits, the remaining bits shall be filled with 0, and the INS high N/2-bit input are all bits 0.

Additionally, the OR enhanced switch is configured to the OR function, and the four-state switch is configured as a random number, and the other positions are normal two-state switches. Said output difference is sent back to the INS network to perform the output confusion operation, wherein the OR enhanced switch and four-state switch functions are configured as two-state switches; and configuring a random selection list of switches that are driven by random number 0 or 1 in the network, and performing the cross or direct operation so that the output is infection result.

In another embodiment of the present invention, said required random number is generated as N/2 by the random number 0 or 1, and the required random number of randomization operation is $N \log_2 N - N/2$.

In yet another embodiment of the present invention, according to the data width of the output difference that obtained in S2 to determine the width N of INS network, and according to the width N to determine the basic structure of the INS network, wherein the INS network topology is back-to-back butterfly network structure, the switch numbers of each stage is N/2, with a total stage of $2 \log_2 N - 1$.

In another embodiment of the present invention, in the INS network, every stage from the 0th stage to stage $\log_2 N - 2$ has N/4 OR enhanced switch, wherein the OR enhanced switch position is the upper part or the lower part of the 0th stage of each sub-network in the INS network.

Additionally, according to another embodiment of the present invention, the security needs of the designer determine the following elements: the number in said INS network, the four-state switch is located on the stage $\log_2 N - 1$ in INS network, and their number. Additionally, Setting the Hamming weight balance operation and the four-state switch configuration bits are set a random number. Finally, the output confusion operation and the four-state switch configuration bit are set as a basic two-state switch.

After the adoption of the above technical aspect, the present invention has the following beneficial effects: The invention can generate the randomization of infection functions in infection countermeasures, reduce the successful probability of fault attack, and improve the safety of the circuit.

BRIEF DESCRIPTION OF THE DRAWINGS

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

Figure 1A:
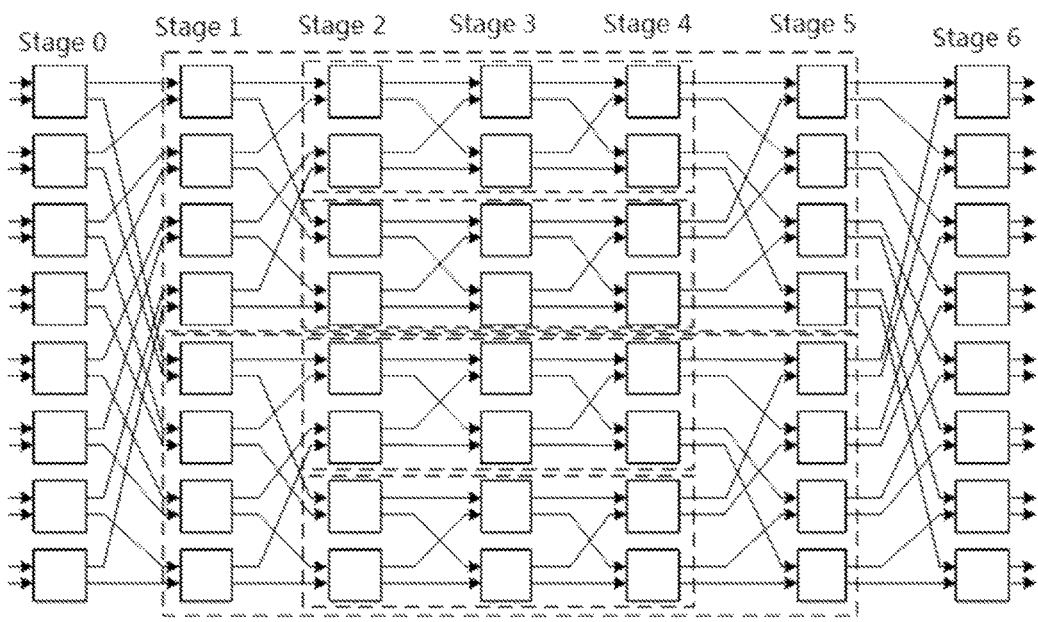
FIG. 1A is a structure diagram of a 16 bits input/output Benes network.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

One INS network-based anti-fault attack method of random infection that described in this invention, including the following steps:

One embodiment of the INS network-based anti-fault attack method of random infection that comprises the steps of: Sending the plain-text into an encryption processor, whereby two groups of cipher text are outputted through temporal or spatial redundancy; Conducting XOR operation on the two groups of said cipher text output to obtain the output difference; Sending the said output difference into an infection function module to initiate an infection operation, so that the infection result can be obtained; Obtaining said infection results, then conducting XOR operation on any of the said group cipher text output to generate the final output.

In one specific embodiment of the present invention, the time redundancy mode generates normal execution and redundant calculation results through repetitive computation; and, the spatial redundancy mode generates normal execution and redundant calculation results in the two same circuits through copying the circuits, respectively.

In another embodiment of the present invention, the output difference is generated by the corresponding cipher text XOR or other corresponding intermediate variables XOR that are calculated by normal execution and redundancy.

In another embodiment of the INS network-based anti-fault attack method of random infection, Sending the said output difference into an infection function module, whereby the output difference is sent into the INS network to perform hamming weight balanced process, and continuously sending the resulting output to the INS network after the hamming weight balanced process is performed; and Initiating an output confusion operation to generate the infection results.

In another embodiment of the INS network-based anti-fault attack method of random infection, the XOR value of infection results is selected corresponding to the intermediate variable; and the infection results are generated as XOR with the selected intermediate variables if the selected intermediate variable is not cipher text; and the XOR results are used to replace the original intermediate variables; and the cryptographic algorithm is continuously performed to generate the final output.

Another embodiment of the present invention includes the following steps: Sending the said output difference into the INS network to perform a hamming weight balanced process, wherein said output difference is input into the low N/2 bit of INS, and wherein if the output difference is less than N/2 bits, the remaining bits shall be filled with 0, and the INS high N/2-bit input are all bits 0. At this time, the OR enhanced switch is configured to OR function, and four-state switch is configured as random number, and other positions are normal two-state switch.

Additionally, the OR enhanced switch is configured to the OR function, and the four-state switch is configured as a random number, and the other positions are normal two-state switches. Said output difference is sent back to the INS network to perform the output confusion operation, wherein the OR enhanced switch and four-state switch functions are configured as two-state switches; and configuring a random selection list of switches that are driven by random number 0 or 1 in the network, and performing the cross or direct operation so that the output is infection result.

In another embodiment of the present invention, said required random number is generated as N/2 by the random number 0 or 1, and the required random number of randomization operation is N $\log_2$ N−N/2.

Additionally, the structure of the INS network refers to a basic BENES network. The following describes the INS design background from the two aspects of BENES basic network topologies and BENES network random characteristics.

Figure 1B:
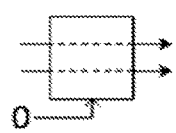
FIG. 1B is a basic principle of the direct state switch.
Figure 1C:
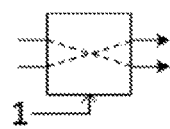
FIG. 1C is a basic principle of cross-state switch.

FIG. 1A is a 16 bit input/output Benes network structure diagram. According to the definition of recursion, a Benes network is made up of multi-stage two-input/two output switches. An N bits Benes network comprises two N/2-bit Benes networks and another two stages (N/2 switches of each stage) of switches. The Dashed box in FIG. 1A marks the sub-network (including 4-input Benes network and 8 inputs Benes network). FIG. 1B and FIG. 1C represent the basic principles of a two state switch: When configuration bit is 0 or 1, the two input switches may perform a straight-through or crossover function. If the configuration bits are entirely random, the probability of a particular input bit being mapped to each output position is the same.

Figure 2:
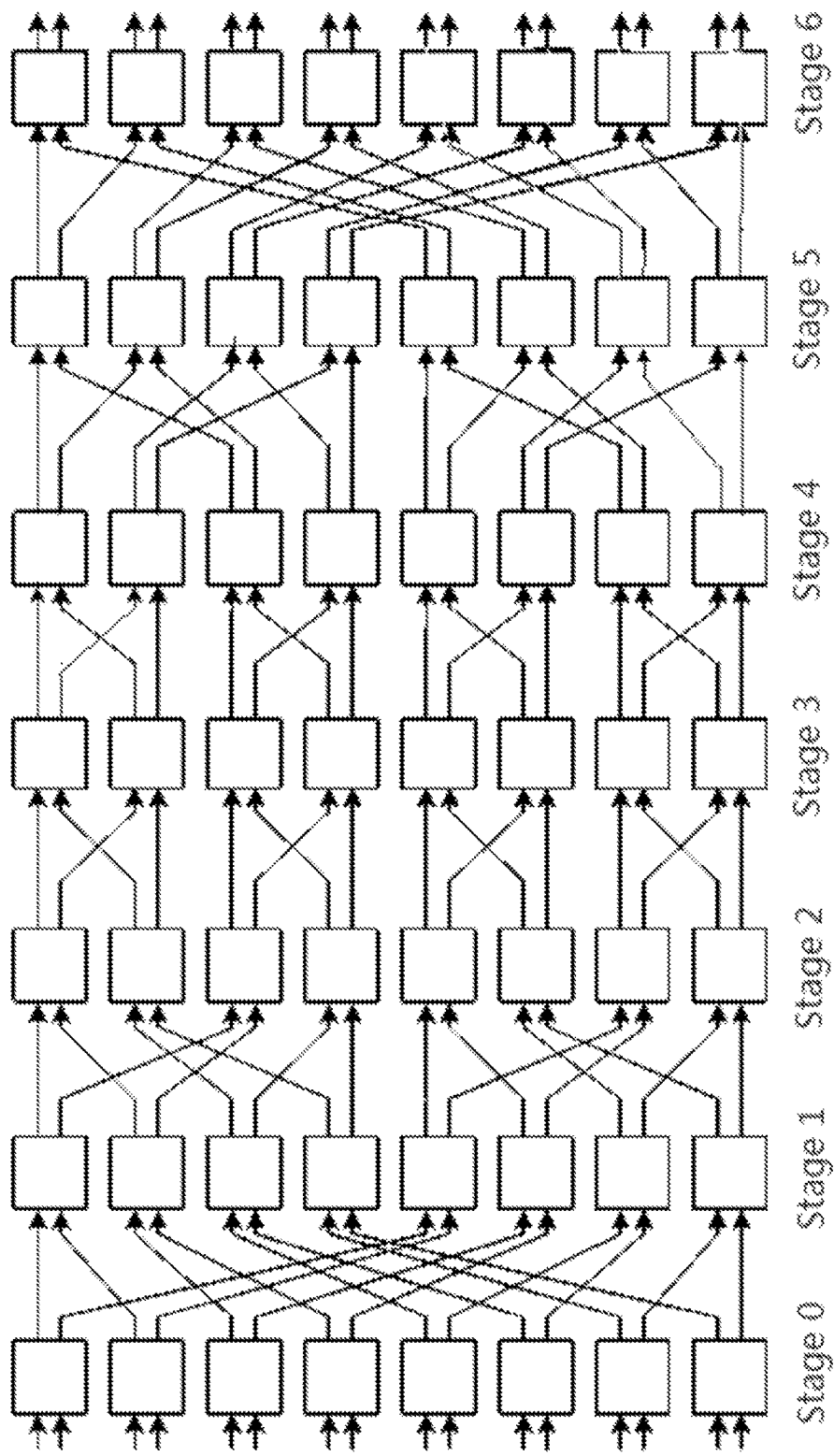
FIG. 2 is random characteristic figure of a BENES network.

FIG. 2 is a random characteristic figure of BENES network, showing the randomization feature of a Benes network. The randomization of the configuration information of the Benes network itself will generate randomization displacement output. The following comprises a network topology-based intuitive analysis from the perspective of qualitative explanation. Because of the symmetry of the Benes network, the following only discusses half of the network structure (from stage $\log_2$ N−1 to stage 2 $\log_2$ N−1.) The configuration information of i+1-th stage switch will further determine whether the bit data in the i-th stage is mapped in the upper part or the lower part of some selected half part. If the configuration bits are entirely random, the probability for a particular input bit is mapped to each output position is the same. For example, the 3rd stage configuration information in this figure will decide whether the 1-bit data is mapped in the higher 8 bits or lower bits in 16 bits output. Similarly, the configuration information in the 4th stage will further determine whether the information is mapped into the higher 4 bits or lower 4 bits in the selected 8 bits output.

Figure 3:
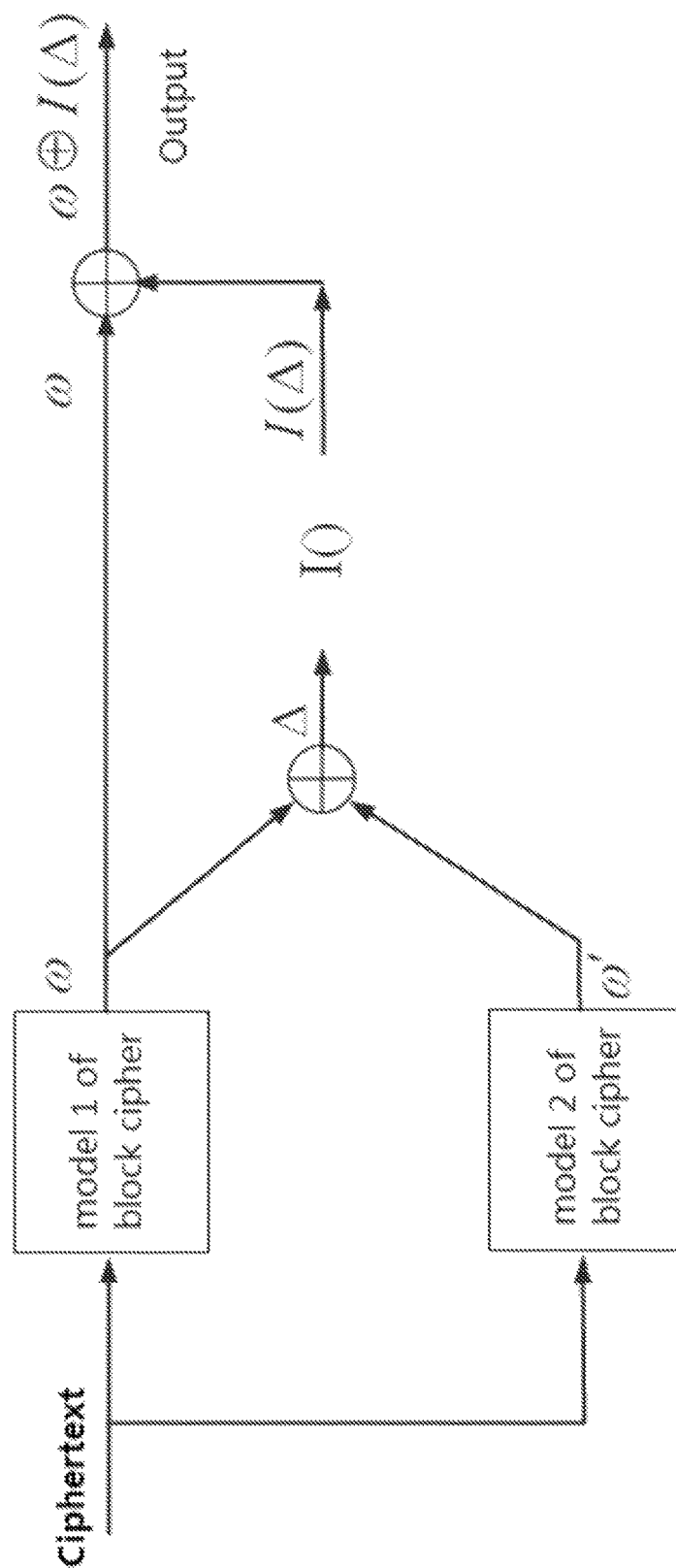
FIG. 3 is a basic implementation steps diagram of infection measures.

FIG. 3 is a basic implementation steps diagram of infection measures. The purpose of infection measures is to destroy the fault diffusion pattern that is hidden in the output cipher text. The design includes two identical block cipher modules, and selecting the output cipher text (ω,ω') to generate XOR or the output Δ. Send the Δ into the infection function module to intitial the infection operation. Then make XOR of the infection operation output Δ and any one of the cipher text to get ω⊕I(Δ), then return it to the block cipher module, producing the ω⊕I(Δ) as cipher text. In particular, the two sets of output that obtained from the block cipher module can be cipher text or intermediate variables in the process of encryption. If the selected intermediate variables are cipher text, then it shall produce XOR of the infection results with the intermediate variables, and then the XOR results are used to replace the original intermediate variables, and the cryptographic algorithm is performed so that the final output can be obtained.

Figure 4:
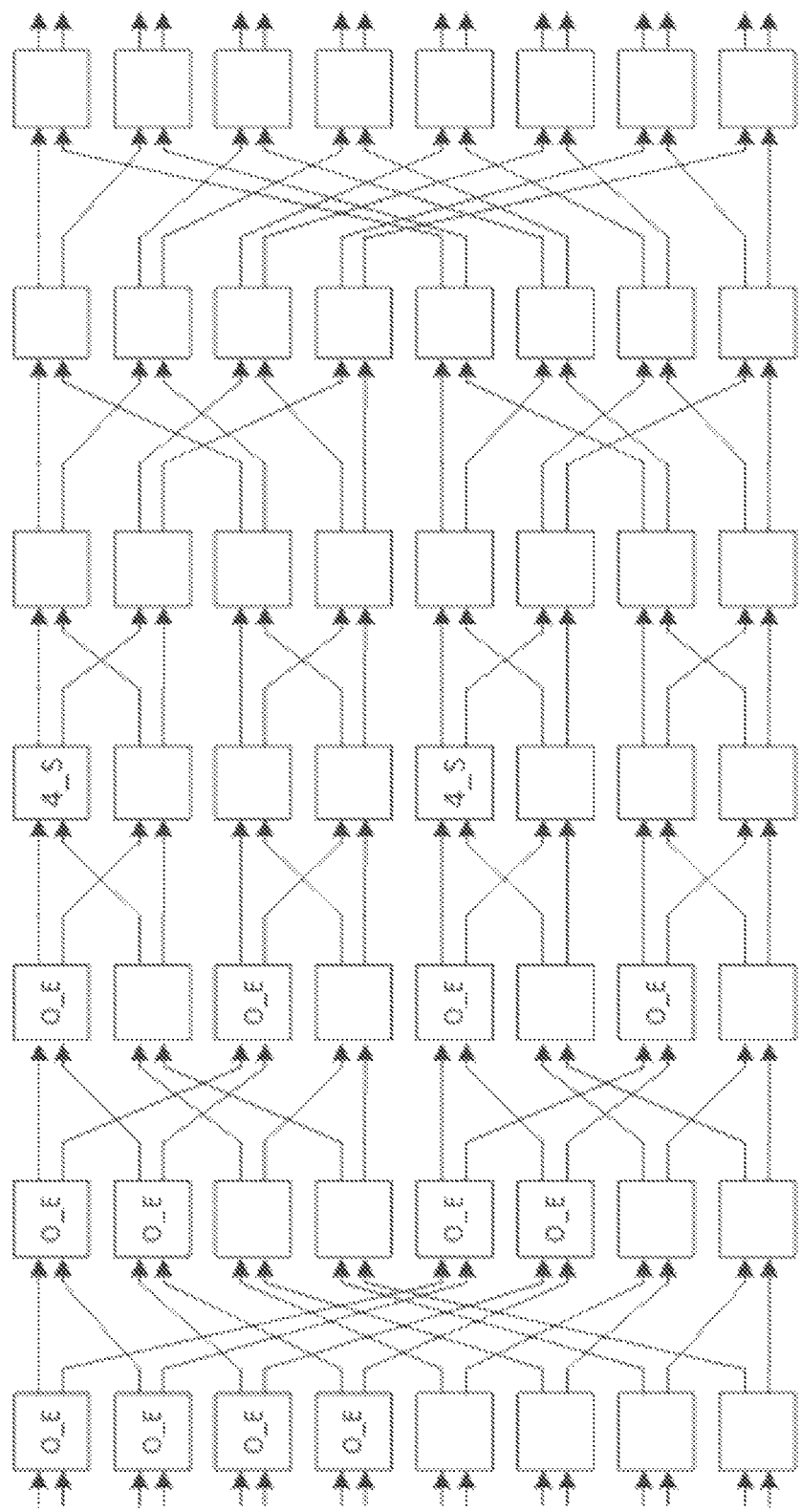
FIG. 4 is a 16 bits INS structure diagram.

FIG. 4 is a 16 bits INS structure diagram, wherein in the INS network, there are N/4 OR enhanced switches of each stage from the 0-th stage to $\log_2$ N−2 stage; the position is the upper half or lower half of the 0-th stage of the INS network and each of its sub-network. For example, in this figure, the OR enhanced switch is in the upper part of the 0-th stage of the 16-bit INS, two 8-bit sub-network, and four 4-bit sub-network. As opposed to the OR enhanced switches, the four-state switch is only present in the stage $\log_2$ N−1 (intermediate stage of Benes networks) and the numbers of four-state switch is dynamically set based on the user demands.

Figure 5:
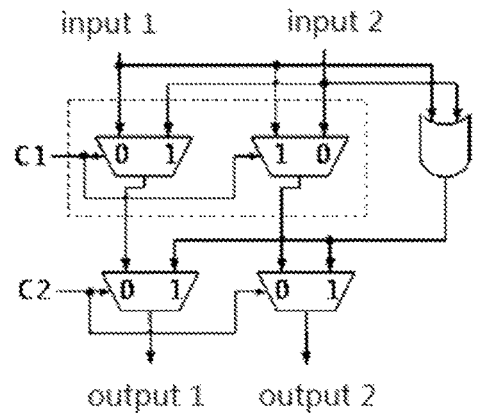
FIG. 5 is a switches model diagram of OR enhanced switch.
Figure 6:
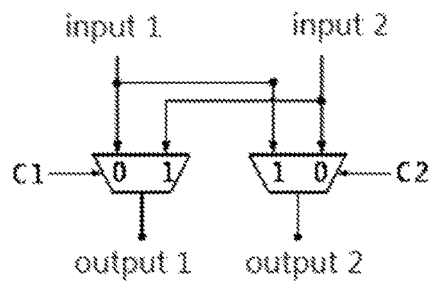
FIG. 6 is a switch model diagram of four-state switches.

FIG. 5 is a switches model diagram of a OR enhanced switch, and 6 is a switch model diagram of four-state switches, wherein C1 and C2 are respectively configuration bits of the switch. In an OR enhanced switch, the control switch or the configuration bit C2 of function is added to the original two-state switch (marked by a dashed box). When C2=0, the OR enhanced switch is the same as the two-input switch. Additionally, when C2=1, the OR enhanced switches may perform the OR function. For the four-state switch, the configuration bits of two multiplexers are separated to perform the function of upper broadcast and lower broadcast. When C1⊕C2=0, the function of four-state switch is same with two-state switch.

Figure 7:
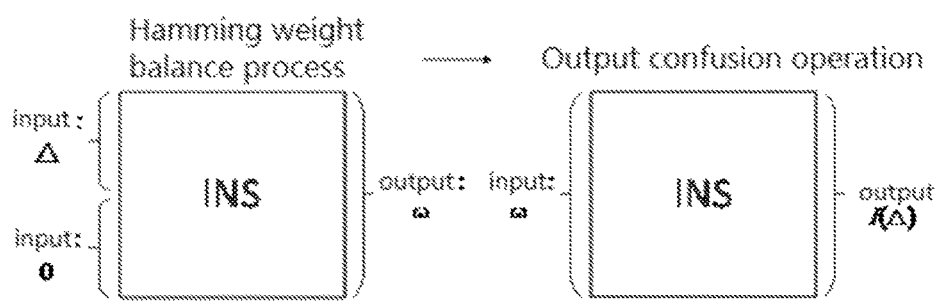
FIG. 7 is a schematic view of a balanced Hamming weight

FIG. 7 is a schematic view of a balanced Hamming weight. During the process of the hamming weight balance process, A is input to the upper part of the INS that corresponds to the input of the 0-th stage OR enhanced switch. The 0-th stage corresponds to the other half input—specifically, the input of the two-state switch is set to 0. In the effect of configuration OR enhanced switch with OR function, it is assumed that Δ≠0, then the input of $\log_2$ N−2 is "110011001100 . . . ". The Benes network structure is fully utilized so that a non-zero-bit data will finally affect the N/2 bit data. In the middle-stage, four-state switch can randomize the hamming weight to a certain extent (depending on the number of switches), which can further enhance the unpredictability. When the bit configuration of the four-state switch is a random number, the probability that the output equals "00,01,10 and 11" is 25%. In the processing for each data block, a four-state switch requires a two-bit random number. It should be noted that in order to support the replacement operation, the width (N) of the network is usually greater than or equal to Δ, and the power of Δ is typically 2. When the width of Δ and that of N is the same, it can add an additional 64 bit OR logic before the 0th stage and reduce the width of Δ to N/2.

Figure 8:
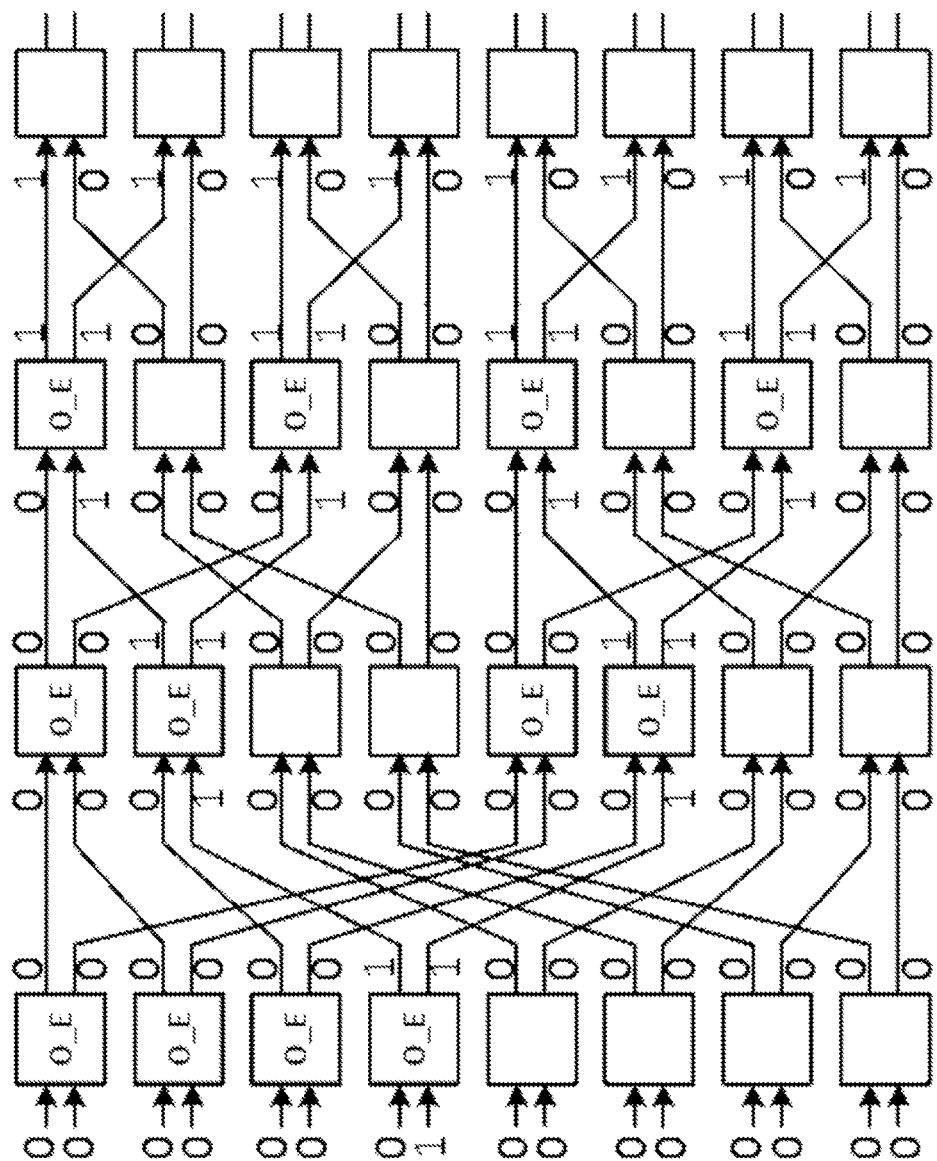
FIG. 8 is an implementation process of an INS network-based infection operation.

FIG. 8 is implementation process of INS network-based infection operation. The Hamming weight balance process operation is initially implemented, and the hamming weight balance process OR enhanced switch performs the OR function, and the control bit C2 of the OR enhanced switch is set to 1, generating the output of $\log_2 N-2$, which is half of 1 and half of 0. Users set the numbers of the four-state switch of stage $\log_2 N-1$ according to their security requirements. The four-state switch can randomize the hamming weight to a certain extent (depending on the number of switches).

During the process of output confusion, the results after the hamming weight balance operation shall be randomized by replacement. At this time, all the switches are configured as the form of two-state switches. Throughout the $2 \log_2 N-1$ stage, randomly select a stage to achieve a control bits randomization. The selected stage-configuration bit is set as a random number to achieve the randomization operation of output confusion. The use of a single stage-based random replacement rather than a full random operation reduces the numbers of random number for infection. The required random number of randomly selected stage to make randomization operation is N/2 bits, while the required random number of full randomization operation is $N \log_2 N-N/2$. The Infection results I ($\Delta$) width is $2 \Delta$ after the INS input confusion, which must take out half of the data I ($\Delta$)/2 of the infection output as output to generate XOR with the original cipher text or intermediate variable value to get the final cipher text. If the selected intermediate is not cipher text, then the infection results here should generate XOR with the selected intermediate variables, and the XOR results are used to replace the original intermediate variables; and the cryptographic algorithm is used to generate the final output. It should be noted that the proposed method of this patent encompasses all randomizing switches scheme according to the designer security requirements at the output confusion stage. However, this arrangement will increase the random number expenditure of each infection operation, and the random number is generated by a true random number generator (TRNG). Even the existing True Random Number Generator (TRNG) speed is very high, but the required TRNG throughput rate of full randomization (for example, 823-bit random number is needed for 128 bits INS of each infection) still presents a challenge for the TRNG design under the conditions of high speed of encryption. Additionally, single-stage randomization operation does not significantly decrease their safety.

While this invention has been described with reference to illustrative: embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

The invention claimed is:

1. A computer-implemented method for implementing an INS network-based anti-fault attack of random infection, comprising executing on a processor the steps of:

sending plain-text into an encryption processor, wherein two groups of cipher texts are outputted through temporal or spatial redundancy;

conducting XOR operation on the two groups of cipher text output to obtain the output difference;

sending the output difference into an infection function module to initiate an infection operation so that the infection result can be obtained; wherein the output difference is sent into the INS network to perform hamming weight balanced process;

continuously sending the resulting output to the INS network after the hamming weight balanced process is performed;

initiating an output confusion operation to generate the infection results; and obtaining the infection results and conducting XOR decipher on any of the groups of cipher text output to generate a final output, wherein the final output is a randomization of infection functions in infection countermeasures to reduce the successful probability of fault attack and improve the safety of a circuit.

2. The method of claim 1, further comprising
generating normal execution results and redundant calculation results via a time redundancy mode through redundant computation; and
generating normal execution results and redundant calculation results via a spatial redundancy mode in the two same circuits through copying the circuit.

3. The method of claim 1, further comprising
generating the output difference by the corresponding cipher text XOR or other corresponding intermediate variables XOR that are calculated by normal execution and redundancy.

4. The method of claim 1, further comprising
selecting the XOR value of infection results corresponding to the intermediate variable;
generating the infection results as XOR with the selected intermediate variables if the selected intermediate variable is not cipher text;
using the XOR results to replace the original intermediate variables; and continuously performing the cryptographic algorithm to generate the final output.

5. The method of claim 1, further comprising:
sending the output difference into the INS network to perform a hamming weight balanced process, wherein the output difference is input into the low N/2 bit of INS, and wherein if the output difference is less than N/2 bits, the remaining bits are filled with 0, and the INS high N/2-bit input are all bits 0;
configuring the OR enhanced switch to the OR function, and the four-state switch is configured as a random number, and other positions are normal two-state switch;
sending said output difference back to the INS network to perform the output confusion operation, wherein the OR enhanced switch and four-state switch functions are configured as two-state switches; and
configuring a random selection list of switches that are driven by random number 0 or 1 in the network, and performing the cross or direct operation so that the output is infection result.

6. The method of claim 5, further comprising
generating the required random number as N/2 by the random number 0 or 1, and the required random number of randomization operation is $2 \log_2 N-1$.

7. The method of claim 1, further comprising determining the width N of the INS network according to the data width of the output difference obtained S2 to determine, and determining the basic structure of the INS network according to the width N, wherein the INS network topology is back-to-back butterfly network structure, the switch numbers of each stage is N/2, with a total stage of $2 \log_2 N-1$.

8. The method of claim 7, further comprising
configuring every stage of the INS network from the 0th stage to stage with a N/4 OR enhanced switch, wherein the OR enhanced switch position is the upper part or the lower part of the 0th stage of each sub-network in the INS network.

9. The method of claim 7, further comprising
determining the security needs of the designer, according to the security requirements of the designer the four-state switch position and the number in said INS network, the four-state switch located on the stage in INS network, and their number; and setting the hamming weight balance operation, the four-state switch configuration bits as a random number; and setting the output confusion operation and the four-state switch configuration bit as a basic two-state switch.

* * * * *